(12) United States Patent
Hallsten et al.

(10) Patent No.: US 9,048,962 B2
(45) Date of Patent: Jun. 2, 2015

(54) SYSTEM AND METHOD FOR DYNAMIC CHANNEL CHANGING

(71) Applicant: Turning Technologies, LLC, Youngstown, OH (US)

(72) Inventors: Jonathan A Hallsten, Barberton, OH (US); Steven R Nelson, Youngstown, OH (US)

(73) Assignee: Turning Technologies, LLC, Youngstown, OH (US)

( * ) Notice: Subject to any disclaimer, the term of this patent is extended or adjusted under 35 U.S.C. 154(b) by 258 days.

(21) Appl. No.: 13/754,459

(22) Filed: Jan. 30, 2013

(65) Prior Publication Data
US 2013/0344797 A1    Dec. 26, 2013

Related U.S. Application Data

(60) Provisional application No. 61/663,103, filed on Jun. 22, 2012.

(51) Int. Cl.
| | |
|---|---|
| *H04H 60/21* | (2008.01) |
| *H04H 60/33* | (2008.01) |
| *G09B 5/00* | (2006.01) |
| *G09B 7/00* | (2006.01) |
| *G07C 13/00* | (2006.01) |
| *H04N 21/00* | (2011.01) |
| *H04W 4/00* | (2009.01) |
| *H04N 21/2385* | (2011.01) |

(52) U.S. Cl.
CPC .............. *H04H 60/33* (2013.01); *G09B 5/00* (2013.01); *G09B 7/00* (2013.01); *G07C 13/00* (2013.01); *H04N 21/00* (2013.01); *H04N 21/2385* (2013.01); *H04W 4/006* (2013.01)

(58) Field of Classification Search
None
See application file for complete search history.

(56) References Cited

U.S. PATENT DOCUMENTS

2007/0192785 A1* 8/2007 Pellinat et al. .................. 725/24
2011/0299428 A1* 12/2011 Cacioppo et al. ............. 370/259

* cited by examiner

*Primary Examiner* — Fayyaz Alam
*Assistant Examiner* — Mohammed Rachedine
(74) *Attorney, Agent, or Firm* — Benesch, Friedlander, Coplan & Aronoff, LLP

(57) ABSTRACT

A method of receiving signals in an audience response system on a plurality of channels comprises receiving a first number of signals on a first channel during a first period of reception for a first predetermined length of time. The method further comprises transmitting at least one acknowledgment signal. The method further comprises receiving a second number of signals on a second channel during a second period of reception for a second predetermined length of time. The method further comprises transmitting at least one additional acknowledgment signal. The method further comprises comparing the first number of signals to the second number of signals. The method further comprises adjusting a future predetermined length of time for a period of reception on one of the first and second channels based on the comparison.

20 Claims, 6 Drawing Sheets

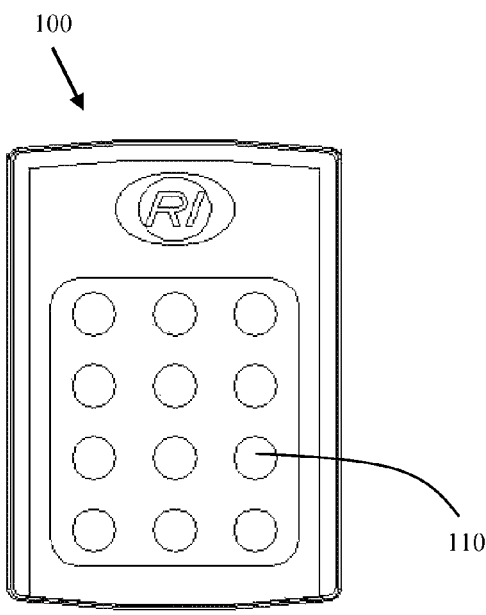
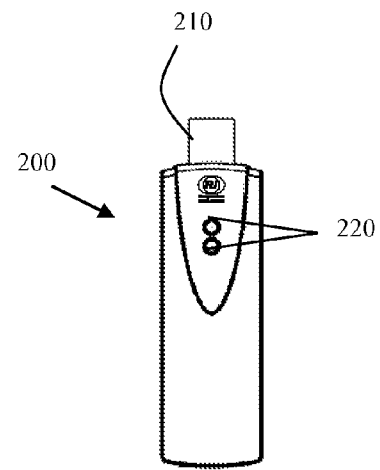
Figure 1
Figure 2

SYSTEM AND METHOD FOR DYNAMIC CHANNEL CHANGING

CROSS REFERENCE TO RELATED APPLICATIONS

This application claims priority to U.S. Provisional Application No. 61/663,103, filed on Jun. 22, 2012, the disclosure of which is incorporated by reference herein in its entirety.

FIELD OF INVENTION

The present disclosure relates to a system and method for dynamically changing a channel in a wireless communication system. More particularly, the present disclosure relates to a wireless audience response system having at least one base unit and a plurality of handheld response units, and a method for dynamically changing a channel of the base unit.

BACKGROUND

Audience response systems are employed to retrieve (or receive) responses from a group of individuals at a central location. Such systems may be used in classroom settings, corporate meetings, or in other gatherings of individuals. Wireless audience response systems may include at least one base unit and a plurality of handheld units. Each handheld unit typically includes a keypad for inputting user responses.

In one known embodiment, all of the handheld units transmit signals on the same channel or band of frequencies. Such a system, however, may not be adaptable to accommodate a handheld unit transmitting on a different channel. In an alternative embodiment, an audience response system may include different hardware versions of handheld units that transmit on different frequencies. In such an embodiment, the base unit is configured to simultaneously receive signals on a plurality of frequencies. However, such a system may not be configured to maximize use of available bandwidth and therefore may not perform optimally.

SUMMARY OF THE INVENTION

A method of receiving signals in an audience response system on a plurality of channels comprises receiving a first number of signals on a first channel during a first period of reception for a first predetermined length of time. The method further comprises transmitting at least one acknowledgment signal. The method further comprises receiving a second number of signals on a second channel during a second period of reception for a second predetermined length of time. The method further comprises transmitting at least one additional acknowledgment signal. The method further comprises comparing the first number of signals to the second number of signals. The method further comprises adjusting a future predetermined length of time for a period of reception on one of the first and second channels based on the comparison.

An audience response system configured to be used during an audience response session comprises a plurality of transmission devices, including at least a first transmission device that transmits wireless signals on a first channel and a second transmission device that transmits wireless signals on a second channel different from the first channel. The audience response system further comprises a base unit. The base unit has a transceiver configured to receive wireless signals on a single channel. The base unit also has logic configured to place the transceiver in a first reception state to receive wireless signals on the first channel for a first length of time, and place the transceiver in a second reception state to receive wireless signals on the second channel for a second length of time. The logic is further configured to compare a number of wireless signals received when the transceiver is in the first reception state to a number of wireless signals received when the transceiver is in the second reception state. The logic is also configured to adjust a length of time for a period of reception on one of the first and second channels based on the comparison.

A base unit for an audience response system comprises a transceiver configured to receive wireless signals on a single channel. The base unit further comprises logic configured to place the transceiver in a first reception state to receive wireless signals on a first channel for a first length of time, and place the transceiver in a second reception state to receive wireless signals on a second channel for a second length of time. The logic is further configured to compare a number of wireless signals received when the transceiver is in the first reception state to a number of wireless signals received when the transceiver is in the second reception state. The logic is also configured to adjust a length of time for a period of reception on one of the first and second channels based on the comparison.

BRIEF DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes in the figures) represent one example of the boundaries. One of ordinary skill in the art will appreciate that one element may be designed as multiple elements or that multiple elements may be designed as one element. An element shown as an internal component of another element may be implemented as an external component and vice versa. The drawings may not be to scale and the proportion of certain elements may be exaggerated for the purpose of illustration.

FIG. 1 is a simplified front plan view of one embodiment of a handheld unit for a wireless response system;

FIG. 2 is a simplified front plan view of one embodiment of a base unit for a wireless response system;

DETAILED DESCRIPTION

Figure 3:
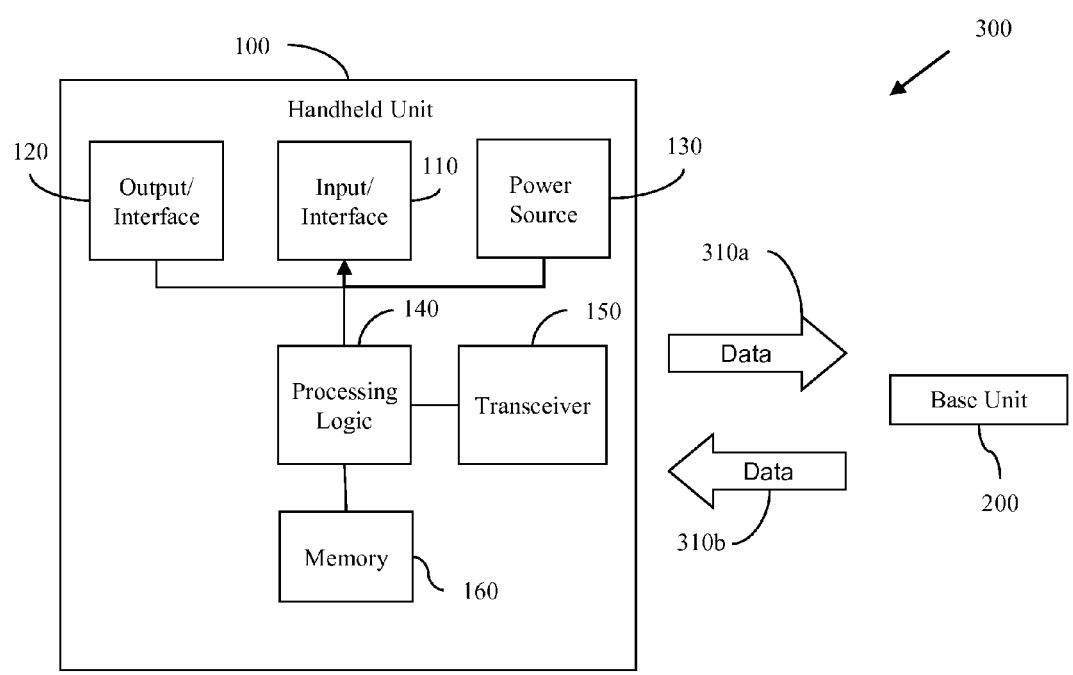
FIG. 3 is a simplified schematic drawing of components of one embodiment of a handheld unit in communication with a base unit.

"Computer-readable medium," as used herein, refers to any medium that participates directly or indirectly in providing signals, instructions and/or data to one or more processors for execution. Such a medium may take many forms, including but not limited to, non-volatile media, volatile media, and transmission media. Non-volatile media may include, for example, optical disks, magnetic disks or so-called "memory sticks." Volatile media may include dynamic memory. Transmission media may include coaxial cables, copper wire, and fiber optic cables. Transmission media can also take the form of acoustic or light waves, such as those generated during radio-wave and infra-red data communications, or take the form of one or more groups of signals. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, an EEPROM, a FLASH-EPROM, phase change memory, any other memory chip or cartridge, a carrier wave/pulse, or any other medium from which a computer, a processor or other electronic device can read.

"Logic," as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmed logic device, memory device containing instructions, or the like. Logic may also be fully embodied as software.

"Signal," as used herein, includes but is not limited to one or more electrical or optical signals, analog or digital signals, one or more computer or processor instructions, messages, a bit or bit stream, or other means that can be received, transmitted, and/or detected.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User," as used herein, includes but is not limited to one or more persons, software, computers or other devices, or combinations of these.

FIG. 1 illustrates a front plan view of one embodiment of a handheld unit 100 for a wireless response system. In the illustrated embodiment, the handheld unit 100 includes a plurality of buttons 110 configured to accept a user input. In alternative embodiments, the handheld unit may employ switches, dials, an LCD touch screen, a graphical user interface, or any other known interface configured to accept a user input.

FIG. 2 illustrates a front plan view of one embodiment of a base unit 200 for a wireless response system. In the illustrated embodiment, the base unit 200 includes a connector 210 configured to be connected to a port of a computer. In an alternative embodiment, the base unit may wirelessly communicate with a computer via an infrared or RF transmitter. In another alternative embodiment, the base unit does not directly connect to a computer.

The base unit 200 includes at least one LED 220. The LED 220 may be configured to indicate on/off status and transmission status. In alternative embodiments, the base unit may employ a dial, an LCD screen, or other known indicators. In another alternative embodiment, the base unit does not include any indicators.

FIG. 3 illustrates one embodiment of a wireless response system 300. In the illustrated embodiment, the system 300 includes at least one handheld unit 100 and at least one base unit 200. The handheld unit 100 includes the plurality of buttons 110 described above that act as an input interface. Alternatively, the input interface may include a keypad, an LCD touchpad, dials, toggle switches, levers, knobs, buttons, or any other appropriate control or input mechanisms.

The handheld unit also includes an output interface 120. In one embodiment, the output interface 120 indicates operating status to a user such as: a signal is being transmitted, an acknowledgment has been received, user entry has been confirmed, and a software update is being received. In such an embodiment, one or more LEDs, an LCD, or other display may serve as an output interface 120. The handheld unit 100 further includes a power source 130, such as the battery described above.

The handheld unit 100 further includes processing logic 140 and a wireless data transceiver 150, such as a radio frequency (RF) transceiver configured to transmit RF signals as shown at 310a and receive RF signals as shown at 310b. In an alternative embodiment (not shown), the handheld unit may include an RF transmitter, but not a receiver or a transceiver. In another alternative embodiment (not shown), the handheld unit may include an infrared (IR) source configured to transmit data and/or an IR sensor configured to receive data.

The input interface 110 is in communication with processing logic 140. When a user inputs a selection into the input interface 110, the user selection is communicated to the processing logic 140. The processing logic 140 then generates and formats a signal for transmission by the transceiver 150. In one embodiment, the signal includes a stored address and the user selection. The address may be a number, a sequence of alphanumeric characters, a sequence of ASCII characters, and the like. In one embodiment, the address is permanently assigned to a handheld unit 100.

The processing logic 140 is in signal communication with one or more computer-readable media, shown in FIG. 3 as a memory 160. The memory 160 is used for data storage purposes, such as to store user responses and the address of the handheld unit 100. The memory 160 also stores the software application and associated executable files, such as a bootstrap loader ("BSL"), RAM, and USB RAM, that are executed by the processing logic 140 to perform the audience response functions described above. Although the memory 160 is shown schematically as a single box, it should be understood that several computer-readable media may constitute the memory 160.

Figure 4:
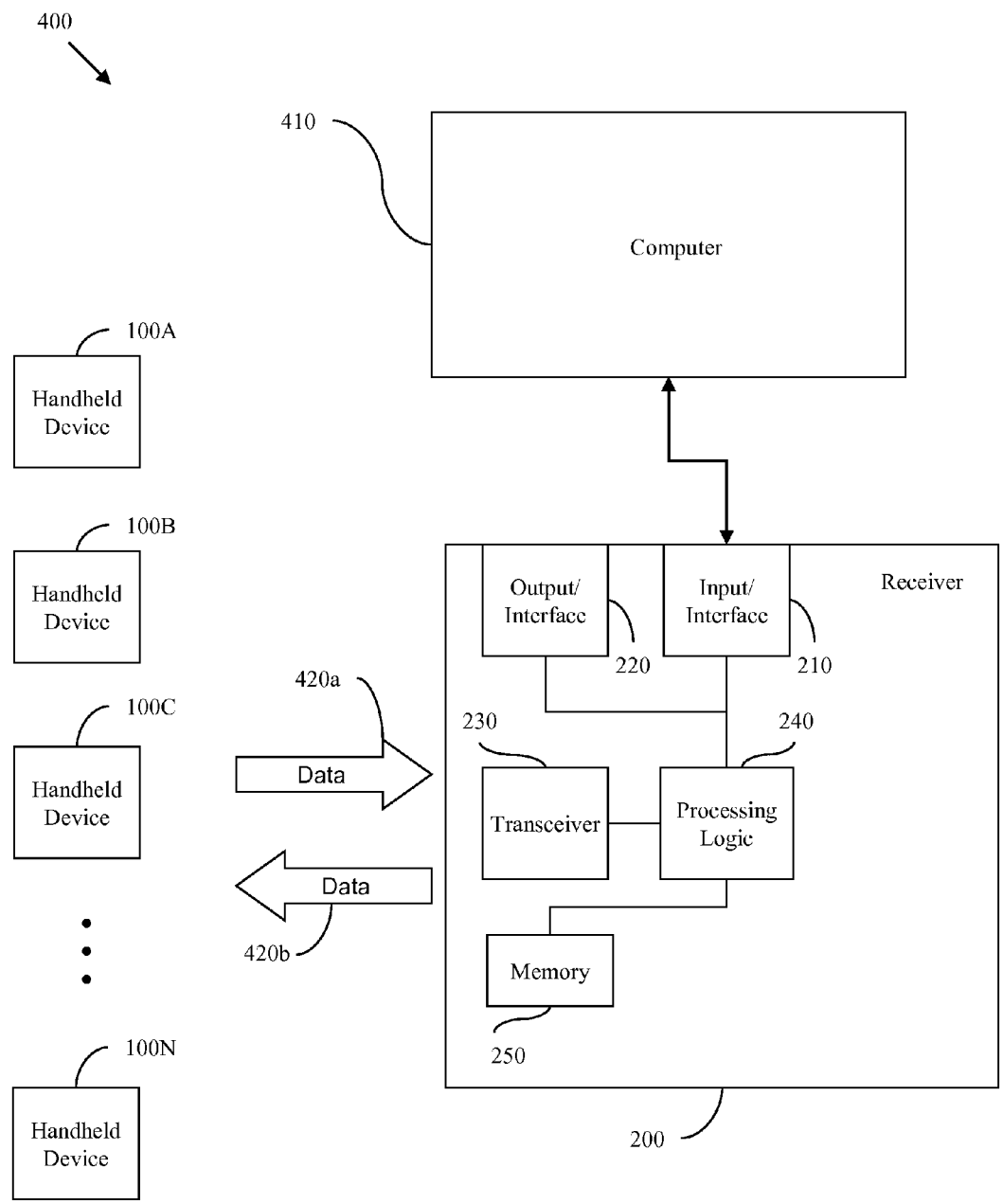
FIG. 4 is a simplified schematic drawing of components of one embodiment of a base unit in communication with a plurality of handheld units.

FIG. 4 illustrates a simplified schematic drawing of one embodiment of a wireless response system 400, having a base unit 200 in communication with a plurality of handheld units 100A-N. The handheld units 100A-N may be substantially the same as the handheld units 100 described above. It should be understood that the base unit 200 may be in data communication with a single handheld unit or many handheld units.

As shown in FIG. 4, the base unit 200 includes an input/interface such as the connector 210 that is in signal communication with a computer 410. In an alternative embodiment (not shown), the base unit may be a stand alone device that is not connected to an external computer.

The base unit 200 further includes an output/interface, such as the LED 220. In alternative embodiments, the base unit may employ an LCD screen or other known displays and indicators.

The base unit 200 also has an RF transceiver 230 configured to receive an RF signal as shown at 420a and send an RF signal as shown at 420b. In an alternative embodiment (not shown), the base unit may include an RF receiver, but not a transmitter or a transceiver. In another alternative embodiment (not shown), the base unit may include an infrared (IR) sensor configured to receive data and/or an IR source configured to transmit data.

The transceiver 230 is in signal communication with processing logic 240. In this embodiment, when a signal is received by the RF transceiver, it is communicated to the processing logic 240, which decodes and parses the signal.

In one embodiment (not shown), the base unit may have an ID. The processing logic may be configured to only accept signals that contain the base unit ID, thus ensuring that any collected data is not skewed by spurious signals. In one embodiment, a replacement base unit may have the same ID as a first base unit. In such an embodiment, the replacement base unit would accept signals from the handheld units, without the need for reprogramming the handheld units. In another embodiment, all manufactured base units may have the same ID.

After the signal has been successfully decoded and parsed, the processing logic 240 may generate an acknowledgment signal that contains, for example, the address and an acknowledgment indicator. The acknowledgment signal may also include an indication of whether the user selection was accepted.

With continued reference to FIG. 4, the base unit 200 also includes a computer-readable medium such as a memory 250, configured, for example, as RAM, FLASH, EEPROM, or other types of writable memory. In one embodiment, the user selection and/or the address are stored in the memory 250 after the signal has been decoded and parsed by the processing logic 240. The storing of the user selection and/or the address may occur before, after, or concurrently with the transmission of the acknowledgment signal. In an alternative embodiment (not shown), the base unit does not have a writable memory and the user selection and unique identifier are instead only communicated to an external computer.

In one embodiment, each of the handheld units 100 transmit signals on the same channel, or band of frequencies, and the base unit 200 is configured to receive the signals on that one channel. In one such embodiment, users are allowed to select one channel for the handheld unit 100 to broadcast from a plurality of channels, and the base unit 200 is set to receive signals on the one selected channel. In such an embodiment, all of the handheld units in the system must be set to the same channel.

In an alternative embodiment, the handheld units 100 transmit signals on a plurality of channels. In one such embodiment, one version of a handheld unit 100 is configured to transmit on a first channel, and a second version of a handheld unit 100 is configured to transmit on a second channel. In one known example, a first version of a handheld unit 100 is set to transmit signals on a first channel, and a second version of a handheld unit 100 is set to transmit signals on a first or second channel, depending on the size of the data packet being transmitted (e.g., small data packets may be transmitted on a first channel, and large data packets may be transmitted on a second channel). Although the above examples illustrate handheld units that transmit on two different channels, it should be understood that the handheld units 100 may also transmit on three or more channels.

In one known embodiment, where the plurality of handheld units 100 transmit signals on a plurality of channels, the base unit 200 is configured to simultaneously receive signals on a plurality of channels. For example, the base unit 200 may include two receivers, with a first receiver tuned to a first channel and a second receiver tuned to a second channel.

Figure 5:
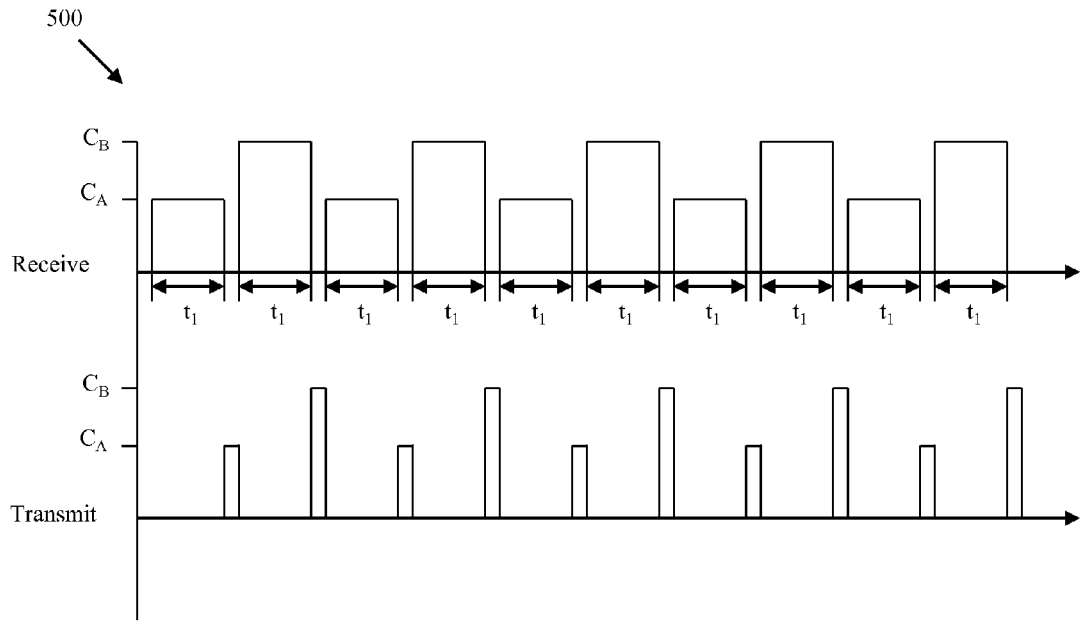
FIG. 5 is a schematic drawing showing one example of stages of reception and transmission for a base unit on a first and second channel.

In another known embodiment, the base unit 200 is configured to receive signals on only one channel at a time, and therefore switches between a plurality of channels. FIG. 5 is a schematic drawing showing one such example 500 of stages of reception and transmission (or reception and transmission states) for a base unit on a first and second channel. In the example 500, the base unit 200 receives signals on a first channel $C_A$ for a first period of reception for a first period of time $t_1$. The base unit 200 then transmits acknowledgment signals on the first channel $C_A$ corresponding to each signal received during the first period of reception. Alternatively, the base unit may transmit the acknowledgment signal on another predetermined channel.

The base unit 200 then receives signals on a second channel $C_B$ for a second period of reception for a time equal to the first period of time $t_1$. The base unit 200 then transmits acknowledgment signals on the second channel $C_B$ corresponding to each signal received during the second period of reception. Alternatively, the base unit may transmit the acknowledgment on another predetermined channel. In one such embodiment, all acknowledgment signals may be sent on the same channel, regardless of the channel the signals were received. In an alternative embodiment, the acknowledgment channel is determined by the channel on which the signal was received.

The base unit 200 then continues to alternate between the channels in the above-described manner.

In one known embodiment, each handheld unit 100 repeatedly transmits a response signal until an acknowledgment signal is received, or until the handheld unit 100 times out after a predetermined amount of time. The periods of base unit reception may be selected such that they are less than the time out period for the handheld units 100. For example, in one known embodiment, the handheld units time out after transmitting a signal for 5 milliseconds, and the each period of base unit reception is 3 milliseconds. This allows the base unit to receive signals and transmit acknowledgments before the handheld units time out.

In one known embodiment, the handheld units 100 and the base unit 200 each transmit at the same transmission rate. In an alternative embodiment, different transmission rates may be employed. For example, the base unit may be configured to transmit at a variety of transmission rates. In one embodiment, the base unit may transmit acknowledgments on the first channel at a first transmission rate, and acknowledgments on the second channel at a second transmission rate different from the first.

Additionally, different handheld units may be configured to transmit at different pre-selected transmission rates. For example, a first handheld unit may transmit data on a first channel at a first transmission rate, and a second handheld unit may transmit data on a second channel at a second transmission rate.

Further, one or more handheld units may be configured to transmit signals at a plurality of different rates. For example, a handheld unit may be configured to transmit signals at a first or second transmission rate, depending on the size of the data packet being transmitted (e.g., small data packets may be transmitted at a higher rate, and large data packets may be transmitted at a lower rate, or vice versa). A handheld unit may transmit at a first transmission rate on a first channel, and at a second transmission rate on a second channel. As one of ordinary skill would understand, data is transmitted faster when it is transmitted at a higher rate, but is more susceptible to loss at greater distances.

Figure 6:
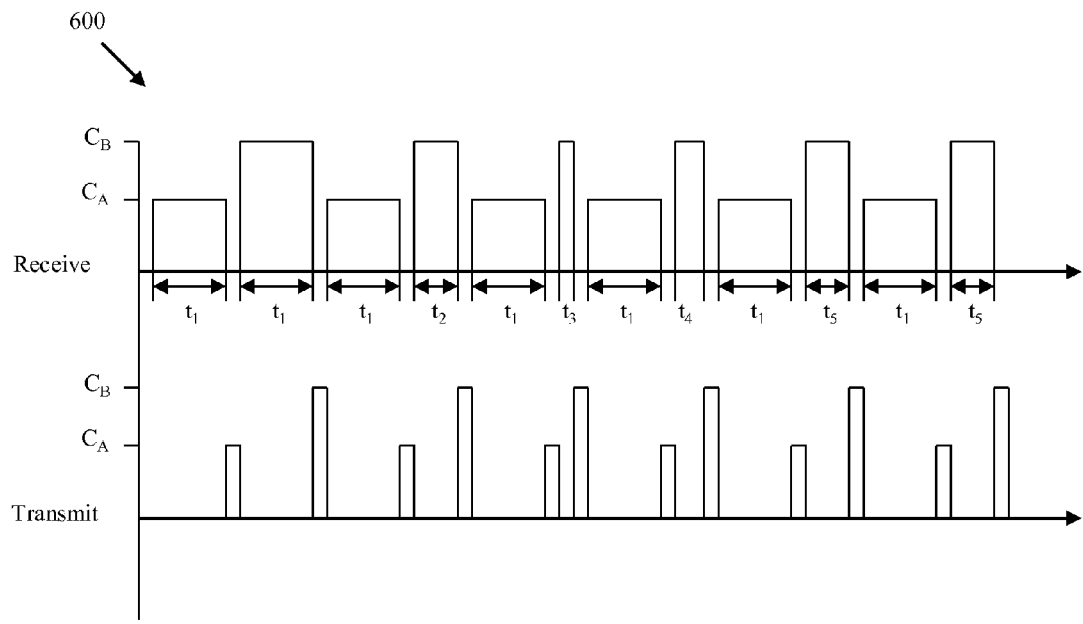
FIG. 6 is a schematic drawing showing an additional example of stages of reception and transmission for a base unit on a first and second channel.

FIG. 6 is a schematic drawing showing another example 600 of stages of reception and transmission for a base unit on a first and second channel. The example 600 begins like example 500, with the base unit 200 receiving signals on a first channel $C_A$ for a first period of reception for a first period of time $t_1$, then transmitting acknowledgment signals on the first channel $C_A$ or another predetermined channel. The base unit 200 then receives signals on a second channel $C_B$ for a second period of reception for a time equal to the first period of time $t_1$, and transmits acknowledgment signals on the second channel $C_B$ or another predetermined channel.

Unlike example 500, the base unit 200 then determines whether more signals were received on the first channel $C_A$ or the second channel $C_B$. In the illustrated example 600, the base unit determines that more signals were received on the first channel $C_A$. Therefore, the base unit 200 receives signals on the first channel $C_A$ for a period of reception equal to the first period of time $t_1$, transmits acknowledgment signals on the first channel $C_A$ or other predetermined channel, and then receives signals on the second channel $C_B$ for a period of reception that is for a second period of time $t_2$ that is less than the first period of time $t_1$. The base unit 200 then transmits acknowledgment signals on the second channel $C_B$ or other predetermined channel.

As one of ordinary skill would understand, the number of handheld units in an audience response system may change over time. For example, new audience members may join an ongoing presentation, or existing members may leave the presentation. Additionally, some or all of the audience members may only provide responses to a select number of questions, rather than all of the questions. Therefore, the periods of reception for a base unit may be continuously adjusted during a session. In the illustrated example 600, the base unit 200 always receives signals on the first channel for a period of reception equal to the first period of time $t_1$, but adjusts the periods of reception on the second channel. After receiving signals on the second channel for the second period of time $t_2$, the base unit determines that fewer signals were received, and employs a shorter third period of time $t_3$. After further determination, the base unit employs a longer period of time $t_4$, and then settles on an optimal period of time $t_5$. In one embodiment, each period of reception is above a predetermined threshold to allow time for signals to be received.

It should be understood that example 600 is presented for illustrative purposes only. While an optimal period of time $t_5$ was found for the second channel $C_B$ in example 600, the period of time may be continuously adjusted in other instances.

In one embodiment, the periods of time are adjusted based on the signals received on a channel during the most recent period of reception on that channel. In an alternative embodiment, the periods of time are adjusted based on the signals received on a channel during a group of periods of reception on that channel. In another alternative embodiment, the periods of time are adjusted based on all of the signals received on that channel during the audience response session.

Figure 7:
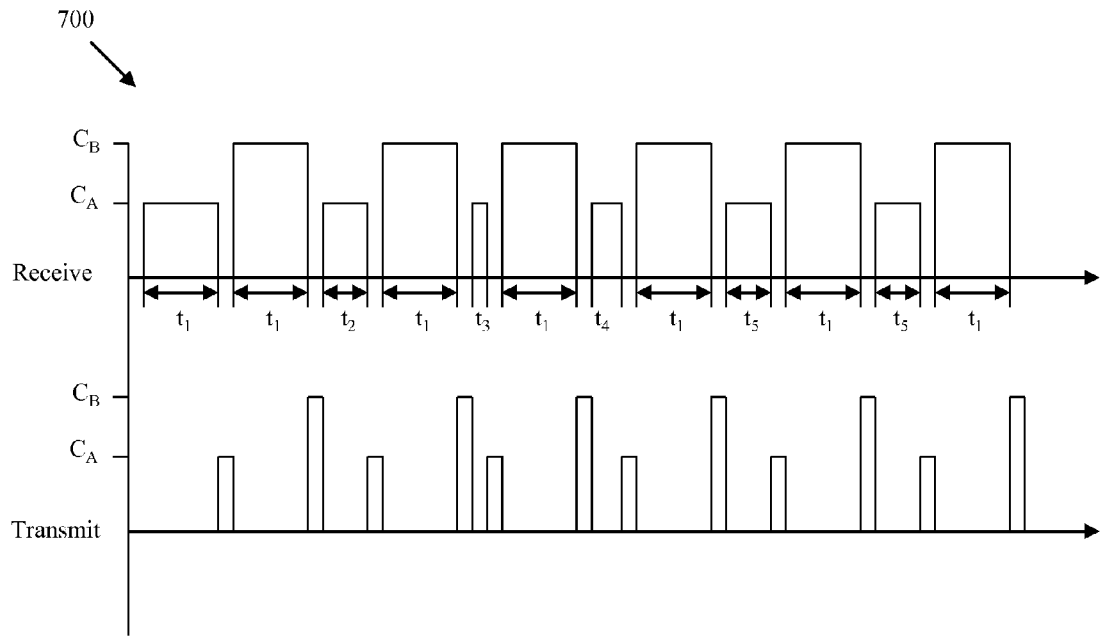
FIG. 7 is a schematic drawing showing another additional example of stages of reception and transmission for a base unit on a first and second channel.

FIG. 7 is a schematic drawing showing another additional example 700 of stages of reception and transmission for a base unit on a first and second channel. Example 700 is similar to example 600, except in this example, the base unit 200 determines that more signals were received on the second channel $C_B$ than on the first channel $C_A$. Therefore, the base unit 200 always receives signals on the second channel for a period of reception equal to the first period of time $t_1$, but adjusts the periods of reception on the first channel.

Figure 8:
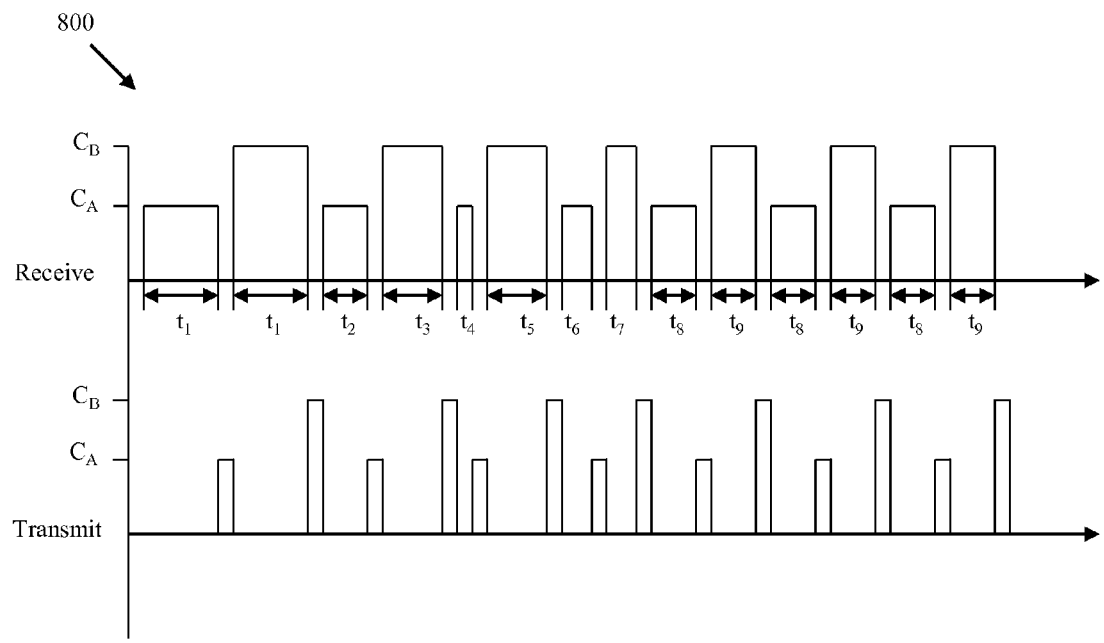
FIG. 8 is a schematic drawing showing yet another additional example of stages of reception and transmission for a base unit on a first and second channel.

FIG. 8 is a schematic drawing showing another additional example 800 of stages of reception and transmission for a base unit on a first and second channel. Example 800 is similar to examples 600 and 700, except in this example, the base unit 200 adjusts the periods of reception on both the first channel and the second channel.

Figure 9:
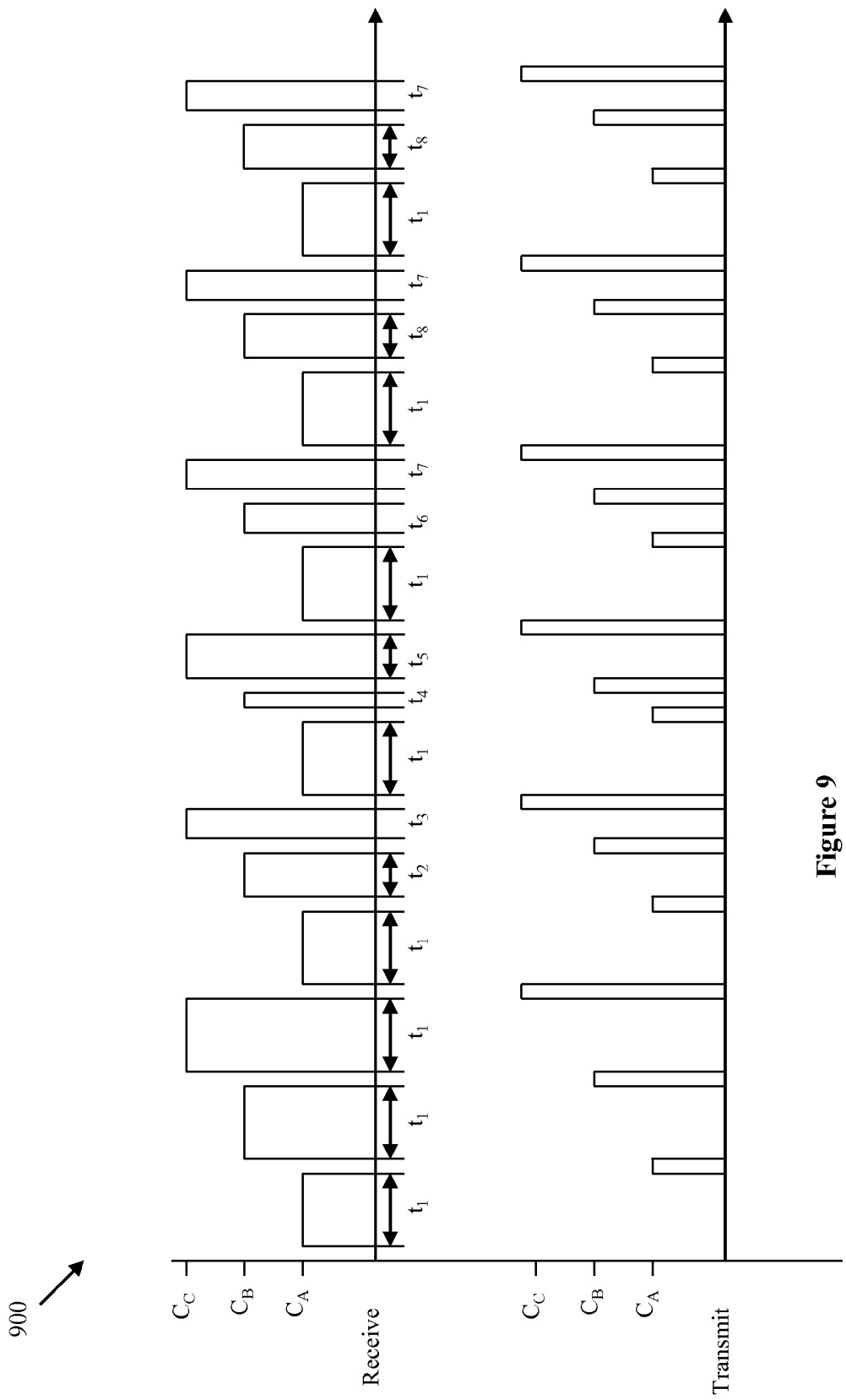
FIG. 9 is a schematic drawing showing one example of stages of reception and transmission for a base unit on a first, second, and third channel.

FIG. 9 is a schematic drawing showing another additional example 900 of stages of reception and transmission for a base unit on a first and second channel. Example 900 is similar to examples 600, 700, and 800 except in this example, the base unit 200 receives signals on three channels, $C_A$, $C_B$, and $C_C$. In example 800 determines that more signals were received on the first channel $C_A$ than on the second channel $C_B$ or the third channel $C_C$. Therefore, the base unit 200 always receives signals on the first channel for a period of reception equal to the first period of time $t_1$, but adjusts the periods of reception on the second channel and third channel.

It should be understood that examples 600-900 are merely exemplary and are not intended to be limiting. In alternative embodiments, four or more channels may be employed. In other alternative embodiments, certain periods of reception may be lengthened while others are maintained or shortened. In still another alternative embodiment, channels may be dynamically added or subtracted as needed. Additionally, a base unit may include multiple transceivers, with one or more transceivers changing between multiple channels. It should be further understood that, although the examples 600-900 illustrate the various channels at what appear to be various amplitudes, this is for illustrative purposes only and is not meant to signify that the various channels operate at various signal strengths.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method of receiving signals in an audience response system on a plurality of channels, the method comprising:

receiving a first number of signals on a first channel during a first period of reception for a first predetermined length of time;

transmitting at least one acknowledgment signal;

receiving a second number of signals on a second channel during a second period of reception for a second predetermined length of time;

transmitting at least one additional acknowledgment signal;

comparing the first number of signals to the second number of signals; and adjusting a future predetermined length of time for a period of reception on one of the first and second channels based on the comparison.

2. The method of claim 1, further comprising receiving a third number of signals on a third channel for a third predetermined length of time, transmitting at least one other additional acknowledgment signal, comparing the first number of signals to the second number of signals and the third number of signals, and adjusting a future predetermined length of time for a period of reception on one of the first, second, and third channels based on the comparison.

3. The method of claim 1, further comprising receiving a third number of signals on the first channel during a third period of reception for a third length of time and receiving a fourth number of signals on the second channel during a fourth period of reception for a fourth length of time.

4. The method of claim 3, further comprising comparing the third number of signals to the fourth number of signals, and adjusting a future predetermined length of time for a period of reception on one of the first and second channels based on the comparison.

5. The method of claim 3, further comprising comparing the first and third number of signals to the second and fourth number of signals, and adjusting a future predetermined length of time for a period of reception on one of the first and second channels based on the comparison.

6. The method of claim 1, wherein the adjusting the future predetermined length of time for a period of reception on one of the first and second channels includes maintaining one of the first and second periods of reception and reducing the other of the first and second periods of reception.

7. The method of claim 1, wherein each period of reception is maintained above a predetermined threshold of time.

8. An audience response system configured to be used during an audience response session, the audience response system comprising:

a plurality of transmission devices, including at least a first transmission device that transmits wireless signals on a first channel and a second transmission device that transmits wireless signals on a second channel different from the first channel; and a base unit having:
  a transceiver configured to receive wireless signals on a single channel,
  logic configured to place the transceiver in a first reception state to receive wireless signals on the first channel for a first length of time, and place the transceiver in a second reception state to receive wireless signals on the second channel for a second length of time,
  wherein the logic is further configured to compare a number of wireless signals received when the transceiver is in the first reception state to a number of wireless signals received when the transceiver is in the second reception state, and
  wherein the logic is also configured to adjust a length of time for a period of reception on one of the first and second channels based on the comparison.

9. The audience response system of claim 8, wherein the logic is configured to repeatedly switch the transceiver between the first reception state and the second reception state during the audience response session.

10. The audience response system of claim 9, wherein the logic is configured to repeatedly adjust a length of time for at least one of the first reception state and the second reception state, based on a comparison of the number of wireless signals received when the transceiver is in the first reception state and the number of wireless signals received when the transceiver is in the second reception state.

11. The audience response system of claim 8, where the number of transmission devices in the audience response system varies during the audience response session.

12. The audience response system of claim 8, wherein the plurality of transmission devices includes a third transmission device that transmits wireless signals on a third channel, and wherein the logic is further configured to place the transceiver in a third reception state to receive wireless signals on the third channel for a third length of time.

13. The audience response system of claim 12, wherein the logic is further configured to compare a number of wireless signals received when the transceiver is in the third reception state to the number of wireless signals received when the transceiver is in the first and second reception state, and wherein the logic is also configured to adjust a length of time for a period of reception on one of the first, second, and third channels based on the comparison.

14. A base unit for an audience response system, the base unit comprising:

a transceiver configured to receive wireless signals on a single channel; and logic configured to place the transceiver in a first reception state to receive wireless signals on a first channel for a first length of time, and place the transceiver in a second reception state to receive wireless signals on a second channel for a second length of time,
  wherein the logic is further configured to compare a number of wireless signals received when the transceiver is in the first reception state to a number of wireless signals received when the transceiver is in the second reception state, and
  wherein the logic is also configured to adjust a length of time for a period of reception on one of the first and second channels based on the comparison.

15. The base unit of claim 14, wherein the logic is configured to repeatedly switch the transceiver between the first reception state and the second reception state during the audience response session.

16. The base unit of claim 14, wherein the logic is configured to repeatedly adjust a length of time for at least one of the first reception state and the second reception state, based on a comparison of the number of wireless signals received when the transceiver is in the first reception state and the number of wireless signals received when the transceiver is in the second reception state.

17. The base unit of claim 14, wherein the logic is further configured to place the transceiver in a third reception state to receive wireless signals on the third channel for a third length of time.

18. The audience response system of claim 17, wherein the logic is further configured to compare a number of wireless signals received when the transceiver is in the third reception state to the number of wireless signals received when the transceiver is in the first and second reception state, and wherein the logic is also configured to adjust a length of time for a period of reception on one of the first, second, and third channels based on the comparison.

19. The base unit of claim 14, wherein the logic adjusts the length of time for a period of reception on one of the first and second channels by maintaining one of the first and second periods of reception and reducing the other of the first and second periods of reception.

20. The base unit of claim 14, wherein the logic adjusts the length of time for a period of reception on one of the first and second channels by maintaining one of the first and second periods of reception and enlarging the other of the first and second periods of reception.

* * * * *